United States Patent
Sasagawa

(10) Patent No.: US 8,456,675 B2
(45) Date of Patent: Jun. 4, 2013

(54) IMAGE FORMING PROCESS MANAGEMENT DEVICE, MANAGEMENT METHOD AND COMPUTER READABLE MEDIUM

(75) Inventor: Shigekazu Sasagawa, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 561 days.

(21) Appl. No.: 12/753,515

(22) Filed: Apr. 2, 2010

(65) Prior Publication Data
US 2011/0051180 A1 Mar. 3, 2011

(30) Foreign Application Priority Data
Aug. 27, 2009 (JP) ................. 2009-196624

(51) Int. Cl.
*G06F 15/00* (2006.01)
*G06F 3/12* (2006.01)
*G06K 1/00* (2006.01)

(52) U.S. Cl.
USPC ........................................ 358/1.15; 358/1.13

(58) Field of Classification Search
None
See application file for complete search history.

(56) References Cited

U.S. PATENT DOCUMENTS

| 6,202,092 | B1 * | 3/2001 | Takimoto | 709/225 |
| 2009/0059286 | A1 * | 3/2009 | Yamaguchi | 358/1.15 |

FOREIGN PATENT DOCUMENTS

| JP | A-07-110857 | 4/1995 |
| JP | A-07-319646 | 12/1995 |
| JP | A-2000-047534 | 2/2000 |
| JP | A-2005-266120 | 9/2005 |
| JP | A-2008-152138 | 7/2008 |

* cited by examiner

*Primary Examiner* — Douglas Tran
(74) *Attorney, Agent, or Firm* — Oliff & Berridge, PLC

(57) ABSTRACT

A management device includes a receiving unit, a judgment unit, a permission unit and a change unit. The permission unit permits the image forming device to perform a requested image forming processes, if the judgment unit judges that a number of image forming process which have been performed is within a first upper limit value. The change unit sets, if the number of image forming process which have been performed exceeds the first upper limit value through the requested and permitted image forming processes being performed, a second upper limit value used for limiting image forming processes at the next time based on an excess amount from the first upper limit value.

3 Claims, 6 Drawing Sheets

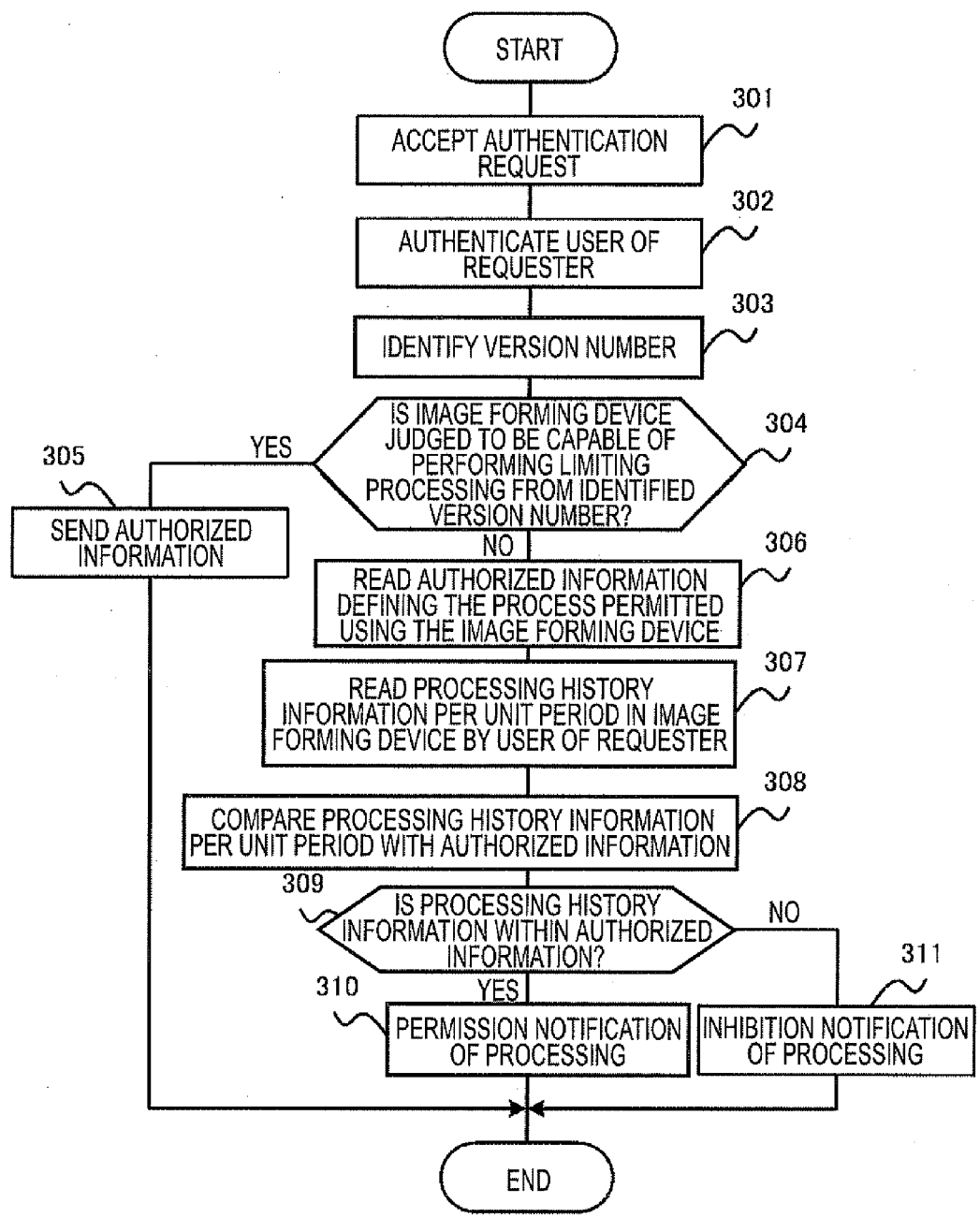

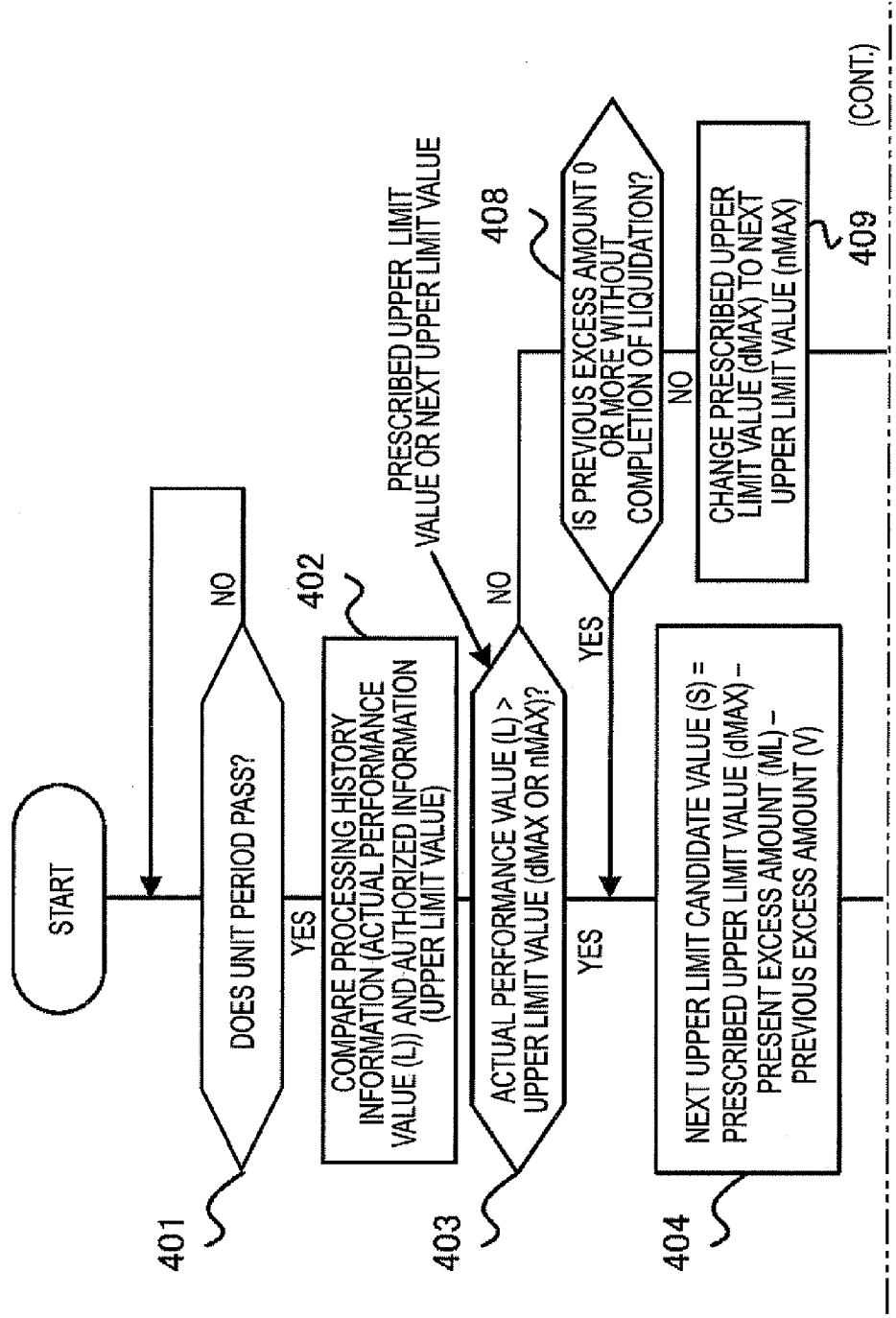

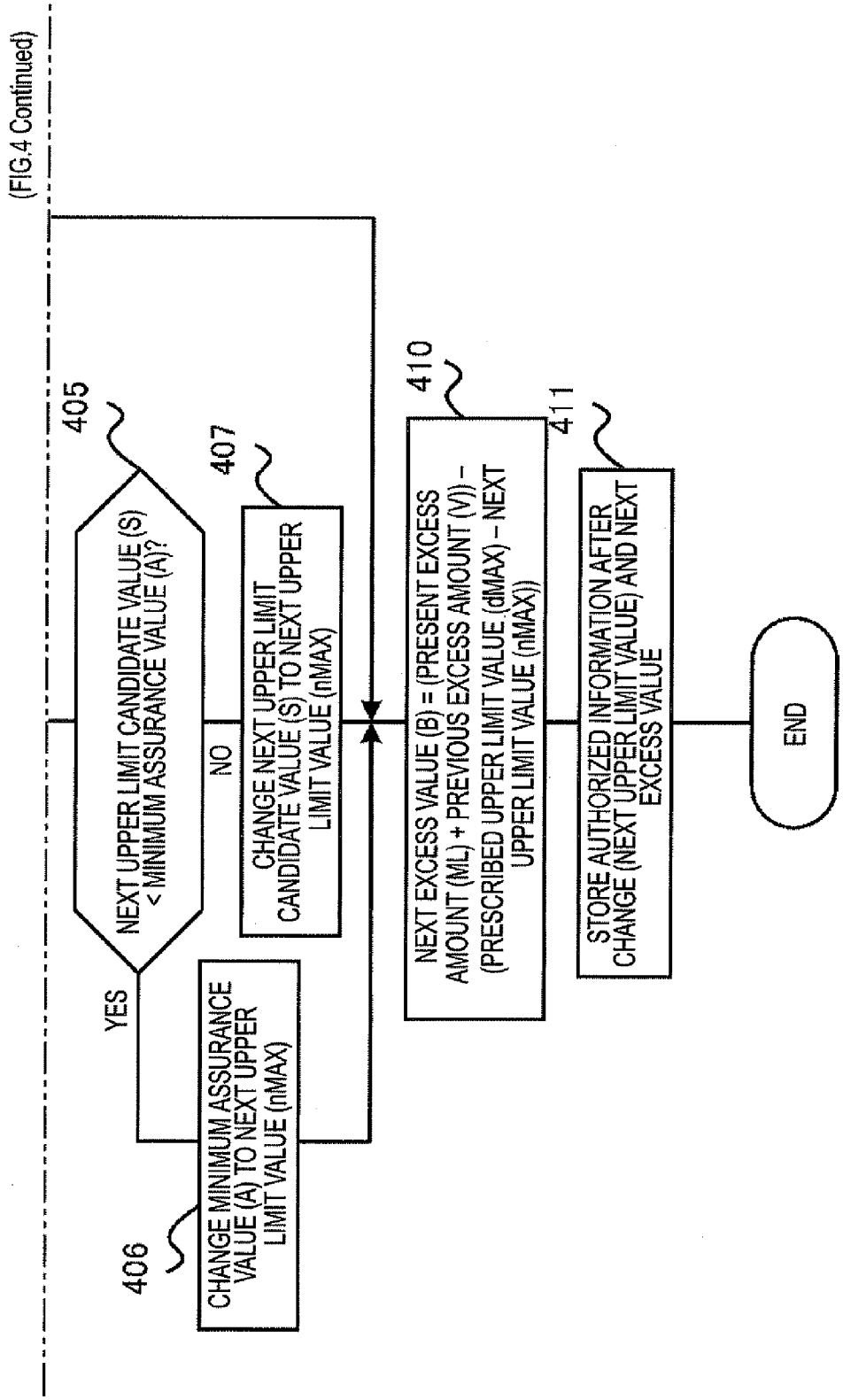

FIG. 5

| | FIRST TIME | SECOND TIME | THIRD TIME | FOURTH TIME |
|---|---|---|---|---|
| 501 ACTUAL PERFORMANCE VALUE (L) | 2100 | 500 | 300 | 200 |
| 502 PRESCRIBED UPPER LIMIT VALUE (dMAX) | 1000 | 1000 | 1000 | 1000 |
| 503 MINIMUM ASSURANCE VALUE (A) | 600 | 600 | 600 | 600 |
| 504 PRESENT EXCESS AMOUNT (ML) | 2100−1000 =1100 | 0 | 0 | 0 |
| 505 PREVIOUS EXCESS AMOUNT (V) | 0 | 700 | 300 | 0 |
| 506 NEXT UPPER LIMIT CANDIDATE VALUE (S) | 1000−1100−0 =−100 | 1000−0−700 =300 | 1000−0−300 =700 | NONE |
| 507 NEXT UPPER LIMIT VALUE (nMAX) | −100<600 →600 | 300<600 →600 | 700>600 →700 | 1000 |
| 508 NEXT EXCESS VALUE (B) | (1100+0)−(1000−600) =1100−400=700 | (0+700)−(1000−600) =300 | (0+300)−(1000−700) =0 | (0+0)−(1000−1000) =0 |

IMAGE FORMING PROCESS MANAGEMENT DEVICE, MANAGEMENT METHOD AND COMPUTER READABLE MEDIUM

CROSS-REFERENCE TO RELATED APPLICATIONS

This application is based on and claims priority under 35 USC 119 from Japanese Patent Application No. 2009-196624 filed on Aug. 27, 2009.

BACKGROUND

Technical Field

The present invention relates to a management device, a management method and a computer readable medium.

SUMMARY

According to an aspect of the invention, A management device includes a receiving unit, a judgment unit, a permission unit, and a change unit. The receiving unit receives a request for image forming process of an image forming device and information regarding the image forming device; The judgment unit, if the image forming device is judged to be incapable of limiting a number of image forming processes to be performed within a first upper limit value based on the information received by the receiving unit, judges whether or not a number of image forming processes which have been performed is within the first upper limit value. The permission unit permits the image forming device to perform the requested image forming processes, if the judgment unit judges that the number of image forming process which have been performed is within the first upper limit value. The change unit sets, if the number of image forming process which have been performed exceeds the first upper limit value through the requested and permitted image forming processes being performed, a second upper limit value which is used for limiting image forming processes at the next time based on an excess amount from the first upper limit value.

BRIEF DESCRIPTION OF THE DRAWINGS

Exemplary embodiment(s) of the present invention will be described in detail based on the following figures, wherein:

FIG. 3 is a flowchart showing the detailed flow of a process performed by the management device according to the exemplary embodiment of the invention.

FIG. 4 is a flowchart showing the detailed flow of a process performed by the management device according to the exemplary embodiment of the invention.

FIG. 5 is a table for specifically explaining the processes as shown in FIGS. 3 and 4.

DETAILED DESCRIPTION

One exemplary embodiment of a management device, a management method and a computer readable medium according to the present invention will be described below in detail with reference to the accompanying drawings.

Figure 1:
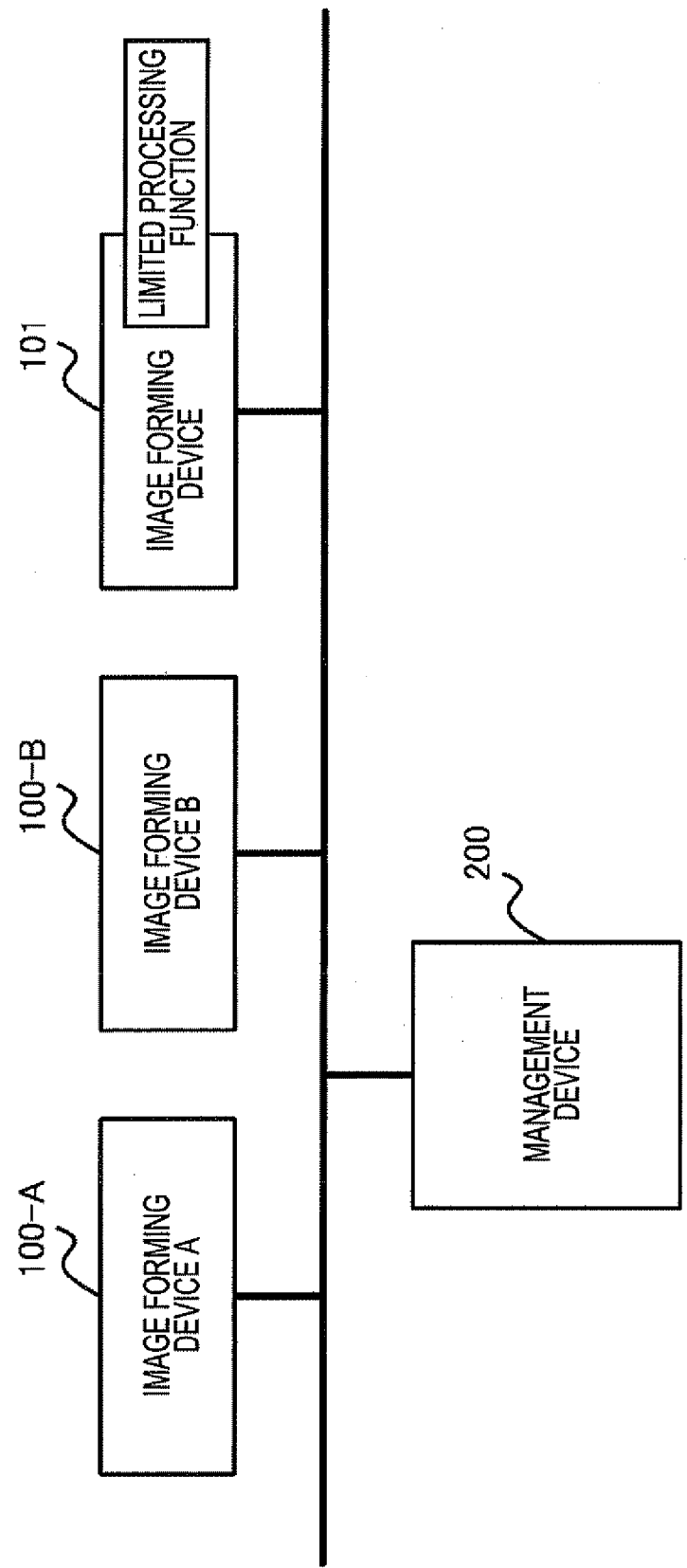
FIG. 1 is a system configuration diagram applying a management device, a management method and a computer readable medium according to an exemplary embodiment of the present invention.

FIG. 1 is a system configuration diagram applying the management device, the management method and the computer readable medium according to the exemplary embodiment of the invention.

In FIG. 1, a management system includes a management device 200, an image forming device A (100-A) and an image forming device B (100-B) for performing the image forming process by accepting a user operation from the user, and an image forming device 101. The image forming device supports a function of limiting processing of limiting the image forming processes managed by the management device 200.

The user makes a processing request to the management device 200 by operating a user interface of the image forming device (100-A, 100-B or 101).

The management device 200 authenticates the user, and makes a response of permitting or inhibiting the image forming process in accordance with a situation whether or not the image forming device (100-A, 100-B, 101) supports the limited processing function.

Figure 2:
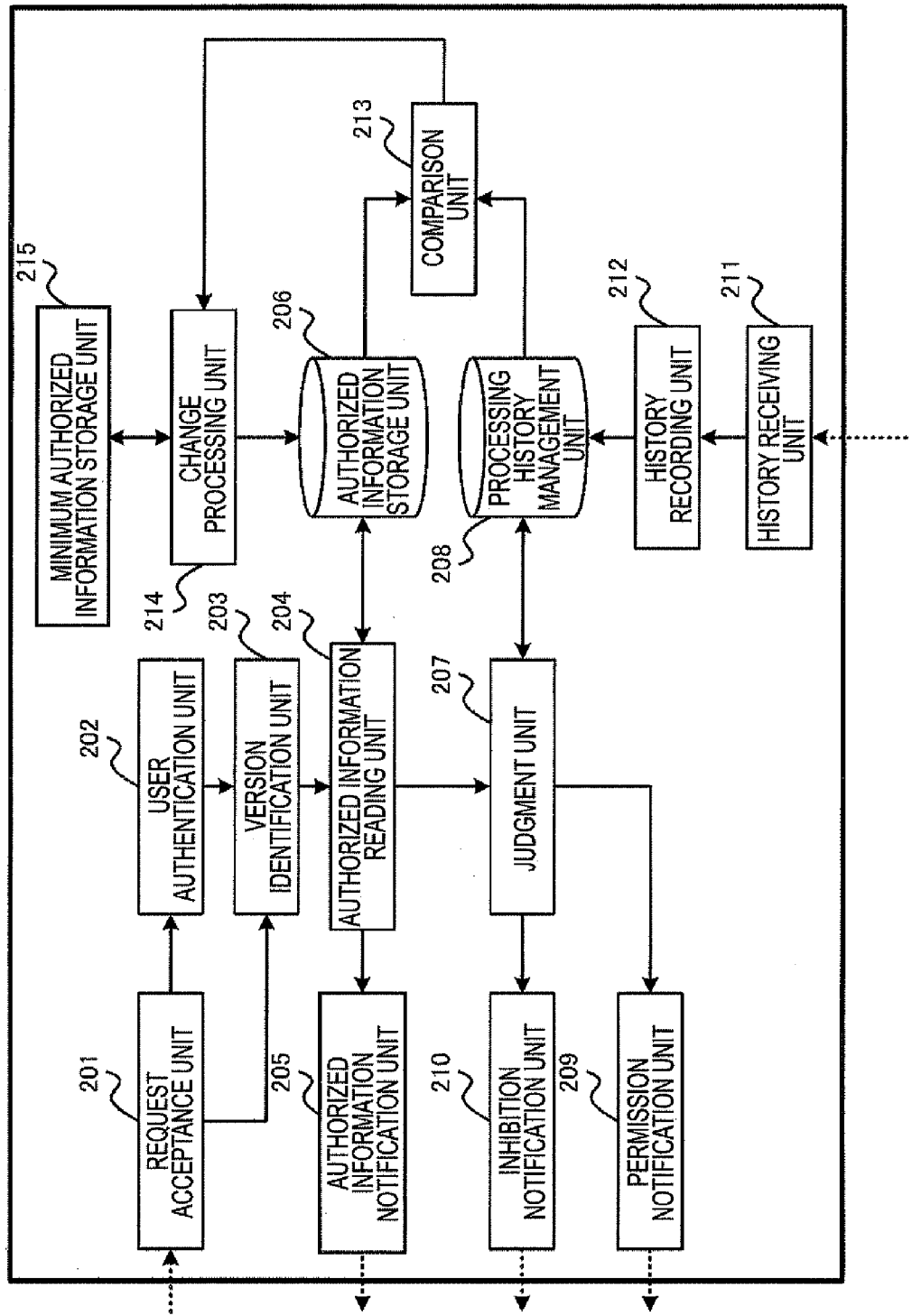
FIG. 2 is a block diagram showing the detailed configuration of the management device according to the exemplary embodiment of the invention.

The detailed configuration of the management device 200 is shown in FIG. 2.

FIG. 2 is a block diagram showing the detailed configuration of the management device according to the exemplary embodiment of the invention.

In FIG. 2, the management device includes a request acceptance unit 201, a user authentication unit 202, a version identification unit 203, an authorized information reading unit 204, an authorized information notification unit 205, an authorized information storage unit 206, a judgment unit 207, a processing history management unit 208, an permission notification unit 209, an inhibition notification unit 210, a history receiving unit 211, a history recording unit 212, a comparison unit 213, a change processing unit 214, and a minimum authorized information storage unit 215.

When the user operates the user interface of the image forming device to make a processing request for image forming process of the image forming device, the request acceptance unit 201 receives the processing request from the image forming device. The request acceptance unit 201 notifies the user information included in the processing request to the user authentication unit 202 for requesting the user authentication, and notifies the version information of the image forming device included in the processing request to the version identification unit 203.

The user authentication unit 202 authenticates the user based on the user information notified from the request acceptance unit 201. The user authentication unit 202 notifies the user information of the authenticated user to the version identification unit 203.

The version identification unit 203 identifies the version number from the version information notified from the request acceptance unit 201. The version identification unit 203 sends the identified version number to the authorized information reading unit 204, together with the user information notified from the user authentication unit 202.

The authorized information storage unit stores the authorized information. The authorized information means, for example, a permissible upper limit value (hereinafter simply referred to as an "upper limit value") of the output count (e.g., the number of printed output sheets or the number of surfaces) in the image forming process.

The authorized information reading unit 204 reads the authorized information stored in the authorized information storage unit 206, based on the user information and the version number sent from the version identification unit 203. If the image forming device of a processing requester is judged according to the sent version number as a device capable of performing the limiting processing based on the authorized information, the authorized information reading unit 204 sends the read authorized information to the authorized information notification unit 205. "The device capable of performing the limiting processing based on the authorized information" indicates that, for example, an image forming apparatus capable of, when receiving the upper limit value and the actual performance value (described later in detail) from the management device, permitting image forming processes by the count of a difference between the upper limit and the actual performance value and limiting image forming processes exceeding the count.

And the authorized information notification unit 205 sends the upper limit value (authorized information) and the actual performance value corresponding to the user information acquired from the processing history management unit 208 to the image forming device of the requester. The difference between the upper limit value and the actual performance value may be sent to the image forming device of the requester.

Meanwhile, if the image forming device of a processing requester is judged according to the sent version number as a device incapable of performing the limiting processing based on the authorized information, the authorized information reading unit 204 sends the read authorized information, the user information and the version number to the judgment unit 207. "The device incapable of performing the limiting processing based on the authorized information" indicates that, for example, an image forming apparatus incapable of, when receiving information inhibiting the image process from the management device, inhibiting the image forming process, and when receiving information permitting the image forming process from the management device, permitting the image forming process beyond the authorized information.

The judgment unit 207 acquires the actual performance value corresponding to the user information from the processing history management unit 208 for managing the processing history, and judges whether the actual performance value is greater than or equal to the upper limit value by comparing the actual performance value with the upper limit value.

If the judgment unit 207 judges that the actual performance value is greater than or equal to the upper limit value, the judgment unit 207 notifies the inhibition notification unit 210 of inhibiting the requested image forming process. Thereby, the inhibition notification unit 210 issues an inhibition notification to the image forming device of the requester.

Meanwhile, if the judgment unit 207 does not judge that the actual performance value is greater than or equal to the upper limit value, the judgment unit 207 notifies the permission notification unit 209 of permitting the requested image forming process. Thereby, the permission notification unit 209 issues a permission notification to the image forming device of the requester.

If the upper limit value of authorized information is the information per unit period (e.g., the number of sheets by which the user is permitted to print out in a month), the judgment unit 207 acquires the processing history per unit period from the processing history management unit 208 and judges whether the actual performance value is greater than or equal to the upper limit value.

In addition, the history receiving unit 211 receives information of the processing content, the processing count and the set information of the image forming processes as the processing history from the image forming device having performed the image forming processes. The history recording unit 212 records the information received by the history receiving unit 211 into the processing history management unit 208. The processing history management unit 208 manages the processing history as processing history information.

The comparison unit 213 compares the actual performance value of the processing history information per unit time managed by the processing history management unit 208 with the upper limit value of the authorized information per unit time stored in the authorized information storage unit 206. A comparison timing by this comparison unit 213 occurs after the elapse of a unit period. This unit period is one day or one month, for example.

As a result of this comparison, if the actual performance value of the processing history information exceeds the upper limit value of the authorized information, the comparison unit notifies the change processing unit 214. The change processing unit 214, upon receiving this notification, calculates an excess amount that the upper limit value is subtracted from the actual performance value and calculates an upper limit candidate value at the next time from the calculated excess amount.

If this calculated upper limit candidate value at the next time is less than or equal to the minimum assurance value, the minimum assurance value of minimum authorized information (described later in detail) is read from the minimum authorized information storage unit 215, and changed to be the upper limit candidate value at the next time. Thereby, the upper limit value of the authorized information is changed.

If the upper limit candidate value at the next time is greater than the minimum assurance value, the upper limit value is changed to the calculated upper limit candidate value at the next time.

Also, if it is judged that the upper limit value is greater than the actual performance value in the change processing unit 214, the preset upper limit value is set to the upper limit value at the next time, judging that the image forming process is performed within the range of authorized information and confirming that there is no excess amount from the previous time.

If there is any excess amount, the same process is performed as in the case where the actual performance value is greater than the upper limit value, so that the upper limit value is changed and set.

And the upper limit value after change is stored as the authorized information in the authorized information storage unit 206.

FIG. 3 is a flowchart showing the detailed flow of a process performed by the management device according to the exemplary embodiment of the invention.

In FIG. 3, an authentication request is accepted from the image forming device to which the user makes a processing request (301), and the user of requester is authenticated (302). Also, the version number of the image forming device is identified from the version information included in the authentication request (303). The version number is not identified from the version information, but the device ID identifying the image forming device of requester may be identified.

If the version number is identified in this way, it is judged from the version number whether the image forming device of requester can limit the processing limitation based on the authorized information (304).

This authorized information is the processing content of the image forming process permitted for the user of requester or a user group to which the user belongs in the image forming device, and includes the number of output sheets, the number of output screens and the output color type, for example, as the processing count of permitting the image forming process, as described above.

Thereby, if it is judged that the image forming device can limit the processing limitation (YES at 304), the authorized information where the user uses the image forming device is sent to the image forming device of requester (305).

Meanwhile, if it is not judged that the image forming device can limit the processing limitation (NO at 304), the authorized information where the user uses the image forming device is read (306). Next, the processing history information in which the user makes the image forming process using the image forming device is read (307).

If the authorized information and the processing history information are read in this way, the processing history information per unit period and the authorized information are compared (308).

As a result of this comparison, it is judged whether the processing history information per unit period is less than or equal to the authorized information (309). If it is judged that the processing history information is less than or equal to the authorized information (YES at 309), an permission notification of permitting the user to perform the image forming process in the image forming device of requester is made, because it is possible to judge that the processing history information falls within the range of authorized information (310).

Also, if it is not judged that the processing history information is less than or equal to the authorized information (NO at 309), an inhibition notification inhibiting the user to perform the image forming process in the image forming device of requester is made (311).

FIG. 4 is a flowchart showing the detailed flow of a process performed by the management device according to the exemplary embodiment of the invention.

In FIG. 4, there is a process where the processing history information recorded exceeds the authorized information by making a permission notification to the image forming device incapable of performing the limiting processing based on the authorized information through the process as shown in FIG. 3.

For example, if the image forming device incapable of performing the limiting processing receives the permission notification, the image forming process can be performed freely. Also, the processing history information to which the processing history is not reflected by accepting a request from the other image forming device in the middle of recording the processing history information and the authorized information are compared, so that the image forming device can be used beyond the authorized information.

In FIG. 4, first of all, it is judged whether the unit period has passed (401), in which no process is performed before the unit period has passed (NO at 401), but if the unit period has passed (YES at 401), the processing history information for the image forming device of each user and the authorized information are compared (402).

In the following process, it is assumed that the authorized information is the upper limit value of the output count (also simply referred to as "upper limit value") managed for each image forming device in each user and the processing history information is the actual performance value of the number of output sheets (also simply referred to as "actual performance value").

As a result of comparing the processing history information (here the actual performance value) and the authorized information (here the upper limit value), it is judged whether the actual performance value is greater than or equal to the upper limit value (403). If it is judged that the actual performance value is greater than or equal to the upper limit value (YES at 403), the upper limit candidate value at the next time is calculated by subtracting the present excess amount and the previous excess amount from the prescribed upper limit value (404).

And it is judged whether the calculated upper limit candidate value at the next time is smaller than the minimum assurance value (405). If the upper limit candidate value at the next time is smaller than the minimum assurance value (YES at 405), the minimum assurance value is changed to the upper limit candidate value at the next time (406). Meanwhile, if the upper limit candidate value at the next time is not smaller than the minimum assurance value (NO at 405), the calculated upper limit candidate value at the next time is changed to the upper limit value at the next time (407).

Next, in judging (405) whether the actual performance value is greater than or equal to the upper limit value, if it is not judged that the actual performance value is greater than or equal to the upper limit value (NO at 405), it is judged whether all the excess amount is liquidated (408) because there is any computed excess amount by judging that the actual performance value of the processing history information exceeds the upper limit value of the authorized information in the previous processing.

If the liquidation of all the excess amount is not completed (YES at 408), the upper limit candidate value at the next time is calculated by subtracting the present excess amount and the previous excess amount from the prescribed upper limit value (404), and the steps following the step (405) of judging whether the calculated upper limit candidate value at the next time is smaller than the minimum assurance value are performed.

Also, if the liquidation of all the excess amount is completed (NO at 408), the minimum assurance output count (simply referred to as "minimum assurance value") is changed to the upper limit value (authorized information) at the next time (409).

If the next upper limit value (authorized information) is set through the above process, the next excess value that is the excess amount at the next time is calculated in accordance with the following expression 1 (410).

Next excess value (B)=(present excess amount (ML)+previous excess amount (V))−(prescribed upper limit value (dMax)−next upper limit value (nMax)) . . . (expression 1).

If the next excess amount that is the excess amount at the next time is calculated in this way, this next excess value and the next upper limit value (authorized information) are stored (411).

A table for specifically explaining the above processes as shown in FIGS. 3 and 4 is shown in FIG. 5.

FIG. 5 shows the contents of the upper limit value (authorized information) and the actual performance value (processing history information) when the user performs the image forming process four times in the same image forming device, for example, the image forming device A (100-A) as shown in FIG. 1.

In FIG. 5, "minimum assurance value" indicates a minimum output count for assuring outputs by the image forming device in a management system in which an actual upper limit value in a second period next to a first period is calculated by subtracting an excess amount in the first period from the predetermined upper limit value in the second period. In other word, the minimum assurance value prevents a case that, when the actual performance value in the first period substantially exceeds the upper limit value, the actual upper limit value in the second period is expected to be zero in the management system.

Also, in FIG. 5, "next excess value" indicates a value obtained through a closing procedure by subtracting a decreased prescribed upper limit value from the present excess amount and the previous excess amount remaining from the previous period.

Firstly, the number of output sheets that the user makes the image forming process using the image forming device A is "2100" as indicated in the "actual performance value (L)" item 501, and the upper limit value of authorized information at this time is "1000" as indicated in the "prescribed upper limit value (dMax)" item 502. Moreover, "600" is indicated in the "minimum assurance value (A)" item 503 specifying the minimum number of output sheets.

At this time, the "present excess amount (ML)" item 504 is "1100" in which "1000" of the "prescribed upper limit value (dMax)" item 502 is subtracted from "2100" of the "actual performance value (L)" item 501. Also, the "previous excess amount (V)" item 505 is "0", because there is no excess amount, and the "next upper limit candidate value (S)" item 506 is the value in which the present excess amount (ML) and the previous excess amount (V) are subtracted from the prescribed upper limit value (dMax).

Moreover, the "next upper limit value (nMax)" item 507 is the upper limit value at the next time, in which the next upper limit value is set to the next upper limit candidate value (S) only if the upper limit candidate value is above the minimum assurance value by comparing the upper limit candidate value in the "next upper limit candidate value (S)" item 506 with the minimum assurance value (A), and if not, the next upper limit value is set to the minimum assurance value (A). In an example of FIG. 5, at the first time, the next upper limit candidate value (S) is "−100" and the minimum assurance value (A) is "600", in which the next upper limit candidate value (S) is not above the minimum assurance value (A), whereby the next upper limit value is set to "600" of the minimum assurance value (A).

And the "next excess value (B)" item 508 is the value obtained by subtracting the value of the prescribed upper limit value (dMax) minus the next upper limit value (nMax) from the sum of the present excess amount (ML) and the previous excess amount (V). The value calculated in this way is the value of the "previous excess amount (V)" item 505 at the next time, that is, the value of the "previous excess amount (V)" item 505 at the second time.

In FIG. 5, the next excess value (B) at the first time is "700" that is obtained by subtracting "400" that is "1000" of the prescribed upper limit value (dMax) minus "600" of the previous excess amount (V) from "1100" that is the sum of the present excess amount (ML) "1100" and the previous excess amount (V) "0". This value is the value of the "previous excess amount (V)" item 505 at the second time.

Each of the items at the second time can be obtained in the same way as above.

At this time, the "next excess value (B)" item 508 at the second time is "300" obtained by subtracting "400" that is the prescribed upper limit value (dMax) "1000" minus the previous excess amount (V) "600" from "700" that is the sum of the present excess amount (ML) "0" and the previous excess amount (V) (at the first time) "700".

At the second time, because the actual performance value at the second time is "500" for the upper limit value "600" defined at the first time, the excess amount is not further cut down by "100", in which because no premium (bonus) from the upper limit value is given corresponding to the excess amount, the excess amount is not further cut down.

Of course, the excess amount can be further cut down by "100". In this case, the "next excess value (B)" item 508 at the second time is "200" by subtracting "100" from "300" as indicated in FIG. 5, and the "previous excess amount (V)" item 505 at the third time is "200".

Next, the "next upper limit candidate value (S)" item 506 at the third time is calculated as "700", in which the next upper limit candidate value is above the minimum assurance value, so that the value of the "next upper limit value (nMax)" item 507 is "700".

Thereby, the next excess value as indicated in the "next excess value (B)" 508 at the third time is "0 (zero)", resulting in a state where all the liquidation is completed.

The above exemplary embodiment is one form of the invention, and the invention is not limited to this exemplary embodiment, but various changes may be made thereto without departing from the spirit or scope of the invention.

In the invention, a management system for performing the above-described process may be configured by executing the above-described operation in the management system having the communication function, or installing a program for configuring the above units from the recording medium (CD-ROM, DVD-ROM, etc.) storing the program into a computer and executing the program. The computer for configuring the management system is connected to a CPU (Central Processor Unit), ROM (Read Only Memory), RAM (Random Access Memory), and a hard disk via a system bus. The CPU performs the processing with the RAM as a working area in accordance with the program stored in the ROM or hard disk.

Also, the medium for supplying the program may be the communication medium (medium temporarily or appropriately holding the program such as the communication line or communication system). For example, the program may be carried on an electronic bulletin board (BBS: Bulletin Board Service) in the communication network and distributed via the communication line.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A management device comprising:
    a receiving unit that receives a request for image forming process of an image forming device and information regarding the image forming device;
    a judgment unit that, if the image forming device is judged to be incapable of limiting a number of image forming processes to be performed within a first upper limit value based on the information received by the receiving unit, judges whether or not a number of image forming processes which have been performed is within the first upper limit value;
    a permission unit that permits the image forming device to perform the requested image forming processes, if the judgment unit judges that the number of image forming process which have been performed is within the first upper limit value; and a change unit that sets, if the number of image forming process which have been performed exceeds the first upper limit value through the requested and permitted image forming processes being performed, a second upper limit value which is used for limiting image forming processes at the next time based on an excess amount from the first upper limit value.

2. A management method comprising:

receiving a request for image forming process of an image forming device and information regarding the image forming device;

judging, if the image forming device is judged to be incapable of limiting a number of image forming processes to be performed within a first upper limit value based on the information received by the receiving unit, whether or not a number of image forming processes which have been performed is within the first upper limit value;

permitting the image forming device to perform the requested image forming processes, if the judgment unit judges that the number of image forming process which have been performed is within the first upper limit value; and setting, if the number of image forming process which have been performed exceeds the first upper limit value through the requested and permitted image forming processes being performed, a second upper limit value which is used for limiting image forming processes at the next time based on an excess amount from the first upper limit value.

3. A non-transitory computer readable medium storing a program causing a computer to execute a process for managing an image forming apparatus, the process comprising:

receiving a request for image forming process of an image forming device and information regarding the image forming device;

judging, if the image forming device is judged to be incapable of limiting a number of image forming processes to be performed within a first upper limit value based on the information received by the receiving unit, whether or not a number of image forming processes which have been performed is within the first upper limit value;

permitting the image forming device to perform the requested image forming processes, if the judgment unit judges that the number of image forming process which have been performed is within the first upper limit value; and setting, if the number of image forming process which have been performed exceeds the first upper limit value through the requested and permitted image forming processes being performed, a second upper limit value which is used for limiting image forming processes at the next time based on an excess amount from the first upper limit value.

* * * * *